(12) United States Patent
Kahn et al.

(10) Patent No.: US 12,341,809 B2
(45) Date of Patent: Jun. 24, 2025

(54) DEFENDING AGAINST VOLUMETRIC ATTACKS

(71) Applicant: Zscaler, Inc., San Jose, CA (US)

(72) Inventors: Clifford Kahn, Santa Clara, CA (US); Jian Liu, Fremont, CA (US); Victor Pavlov, Palo Alto, CA (US); Srinivas Kavuri, San Jose, CA (US); John A. Chanak, Saratoga, CA (US)

(73) Assignee: Zscaler, Inc., San Jose, CA (US)

( * ) Notice: Subject to any disclaimer, the term of this patent is extended or adjusted under 35 U.S.C. 154(b) by 335 days.

(21) Appl. No.: 17/988,128

(22) Filed: Nov. 16, 2022

(65) Prior Publication Data

US 2024/0163308 A1 May 16, 2024

(51) Int. Cl.
*H04L 9/40* (2022.01)
(52) U.S. Cl.
CPC .......... *H04L 63/1458* (2013.01); *H04L 63/08* (2013.01)
(58) Field of Classification Search
CPC ............................ H04L 63/1458; H04L 63/08
See application file for complete search history.

(56) References Cited

U.S. PATENT DOCUMENTS

| | | | |
|---|---|---|---|
| 6,636,923 B1 | 10/2003 | Meirsman et al. | |
| 8,869,259 B1 | 10/2014 | Udupa et al. | |
| 9,866,566 B2 * | 1/2018 | Dulkin | H04L 63/102 |
| 2005/0188028 A1 * | 8/2005 | Brown | H04L 51/226 |
| | | | 709/206 |
| 2006/0074618 A1 | 4/2006 | Miller et al. | |
| 2007/0042756 A1 | 2/2007 | Perfetto et al. | |
| 2008/0307519 A1 | 12/2008 | Curcio | |
| 2009/0129271 A1 | 5/2009 | Ramankutty et al. | |
| 2011/0296486 A1 | 12/2011 | Burch et al. | |
| 2011/0310899 A1 | 12/2011 | Alkhatib et al. | |
| 2012/0023325 A1 | 1/2012 | Lai | |

(Continued)

FOREIGN PATENT DOCUMENTS

| | | | | |
|---|---|---|---|---|
| CN | 108155933 A | * | 6/2018 | ........... H04B 10/038 |
| CN | 111049806 A | * | 4/2020 | ............. G06Q 40/04 |

(Continued)

OTHER PUBLICATIONS

Huang et al. English translation of CN 113422762 A. (Year: 2021).*
Wang. English translation of CN 114172677 A. (Year: 2022).*

*Primary Examiner* — Sarah Su
(74) *Attorney, Agent, or Firm* — Baratta Law PLLC; Lawrence A. Baratta, Jr.

(57) ABSTRACT

Systems and methods for defending against volumetric attacks, implemented in a cloud-based system. Embodiments include steps of, monitoring flows and a rate of requests to a Data Center (DC); receiving a request from an address to the DC, the request being for a service in a cloud-based system; determining if the address has been successfully authenticated within a past predetermined time period; responsive to the address not having been successfully authenticated within the past time period, and one of (i) the rate of requests being above a threshold or (ii) the number of flows being above a threshold, placing the address in a penalty box for a predetermined amount of time; and blocking requests from the address in the penalty box for the predetermined amount of time.

17 Claims, 7 Drawing Sheets

(56) References Cited

U.S. PATENT DOCUMENTS

| | | | |
|---|---|---|---|
| 2012/0185913 A1 | 7/2012 | Martinez et al. | |
| 2012/0281708 A1 | 11/2012 | Chauhan et al. | |
| 2013/0347072 A1 | 12/2013 | Dinha | |
| 2014/0022586 A1 | 1/2014 | Zehler | |
| 2014/0250537 A1* | 9/2014 | Siris | H04L 63/10 726/28 |
| 2014/0282817 A1 | 9/2014 | Singer et al. | |
| 2014/0325596 A1* | 10/2014 | Edwards | H04L 63/08 726/3 |
| 2014/0379902 A1* | 12/2014 | Wan | H04L 63/1441 709/224 |
| 2015/0067338 A1* | 3/2015 | Gero | H04L 63/061 713/171 |
| 2017/0093834 A1* | 3/2017 | Natu | H04L 63/0272 |
| 2018/0270201 A1* | 9/2018 | Chanak | H04L 9/14 |
| 2022/0385656 A1* | 12/2022 | Gujarathi | H04L 63/0876 |
| 2023/0019448 A1* | 1/2023 | Deshmukh | H04L 63/1433 |
| 2024/0098073 A1* | 3/2024 | Adogla | G06Q 30/0633 |
| 2024/0223534 A1* | 7/2024 | Gu | H04L 63/0236 |

FOREIGN PATENT DOCUMENTS

| | | | | |
|---|---|---|---|---|
| CN | 113422762 A | * | 9/2021 | |
| CN | 110677378 B | * | 11/2021 | H04L 61/6022 |
| CN | 114172677 A | * | 3/2022 | H04L 63/10 |
| CN | 115085980 A | * | 9/2022 | H04L 63/083 |
| CN | 116633582 A | * | 8/2023 | |
| KR | 20170104947 A | * | 9/2017 | H04L 29/06 |
| KR | 102206847 B1 | * | 1/2021 | H04L 29/06 |
| KR | 20240140136 A | * | 9/2024 | |
| WO | WO-02073472 A1 | * | 9/2002 | G06F 21/335 |
| WO | WO-2007059183 A2 | * | 5/2007 | H04L 51/00 |
| WO | WO-2013002538 A2 | * | 1/2013 | G06F 21/55 |
| WO | WO-2021242226 A1 | * | 12/2021 | |
| WO | WO-2022040441 A1 | * | 2/2022 | G06F 21/31 |

* cited by examiner

DEFENDING AGAINST VOLUMETRIC ATTACKS

FIELD OF THE DISCLOSURE

The present disclosure generally relates to computer networking systems and methods. More particularly, the present disclosure relates to systems and methods for defending against volumetric attacks.

BACKGROUND OF THE DISCLOSURE

With applications moving to the cloud, the perimeter of an enterprise network has extended to the Internet. This results in an increased risk for the enterprise data residing on unsecured and unmanaged devices as well as the security risks in access to the Internet. Attackers use a variety of methods to cripple enterprise networks by launching attacks against specific targets, such as specific service providers. These attacks can include volumetric attacks designed to overwhelm network capacity, or to hide a more focused application layer attack. These attacks are carried out by sending a high volume of requests to a destination in order to collapse the network infrastructure. Cloud-based security solutions to prevent such attacks have emerged, and are discussed in the present disclosure.

BRIEF SUMMARY OF THE DISCLOSURE

In various embodiments, the present disclosure includes a method with steps, a cloud-based system configured to implement the steps, and a non-transitory computer-readable medium storing computer-executable instructions for causing performance of the steps. The steps include monitoring Transmission Control Protocol (TCP) connections and a rate of requests to a Data Center (DC); receiving a request from an address to the DC, the request being for a service in a cloud-based system; determining if the address has been successfully authenticated within a past predetermined time period; responsive to the address not having been successfully authenticated within the past time period, and one of (i) the rate of requests being above a threshold or (ii) the number of TCP connections being above a threshold, placing the address in a penalty box for a predetermined amount of time; and blocking requests from the address in the penalty box for the predetermined amount of time.

Embodiments can further include wherein the steps are performed only during a volumetric attack. The steps can further include responsive to the address having been successfully authenticated within the past predetermined time period, attempting to authenticate the request; responsive to successful authentication, updating a friendly list associated with the cloud-based system; and responsive to a failed authentication, placing the address in the penalty box for a predetermined amount of time. The steps can similarly include responsive to the rate of requests and the number of TCP connections being below their associated thresholds, attempting to authenticate the address; responsive to successful authentication, updating a friendly list associated with the cloud-based system; and responsive to a failed authentication, placing the address in the penalty box for a predetermined amount of time. The friendly list can be stored in the cloud-based system, and is accessible by the entire cloud-based system. A replica of the friendly list can be stored in each of a plurality of DCs in the cloud-based system. The request can further be allowed or blocked based on policy.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

Example Cloud-Based System Architecture

Figure 1A:
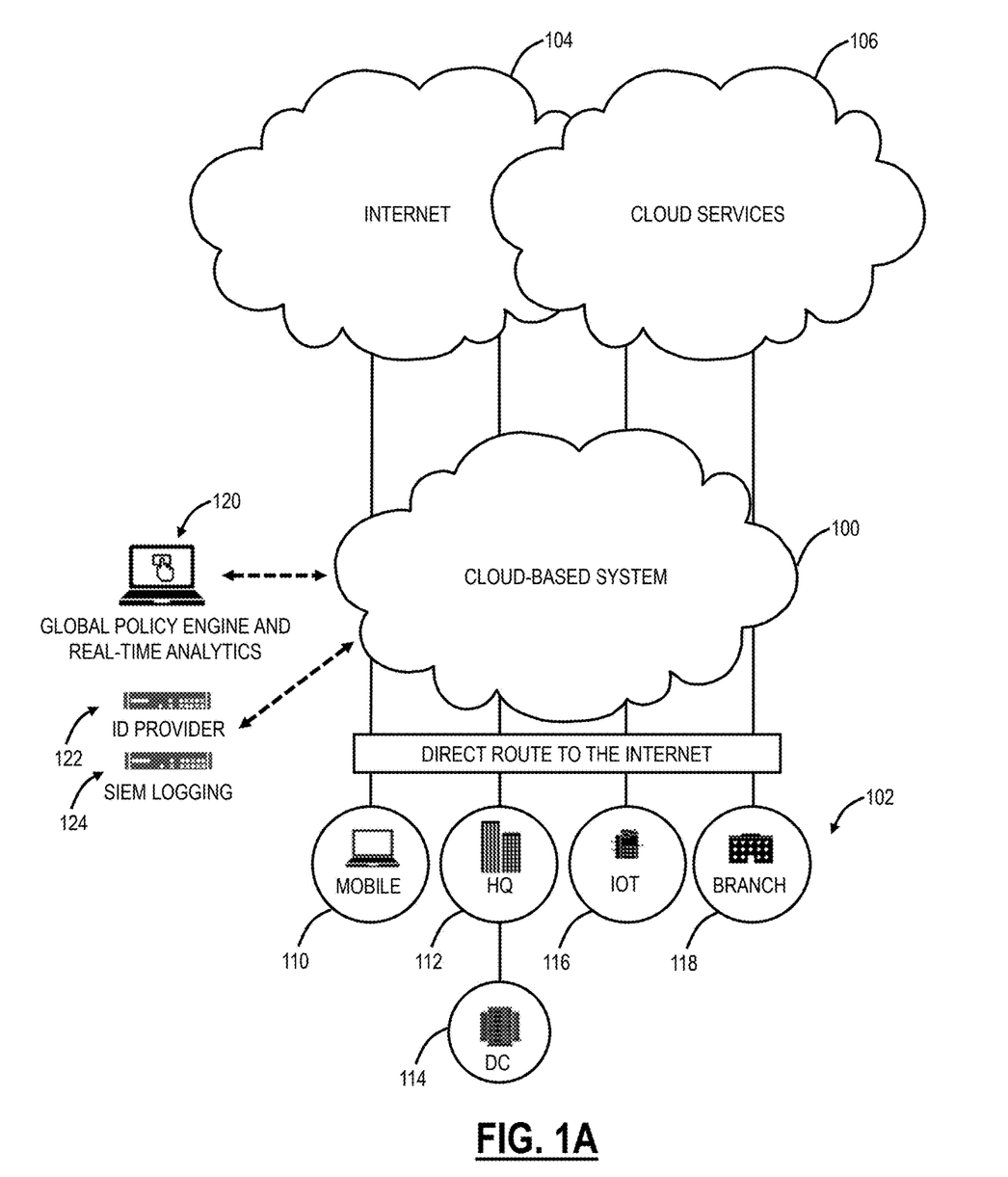
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
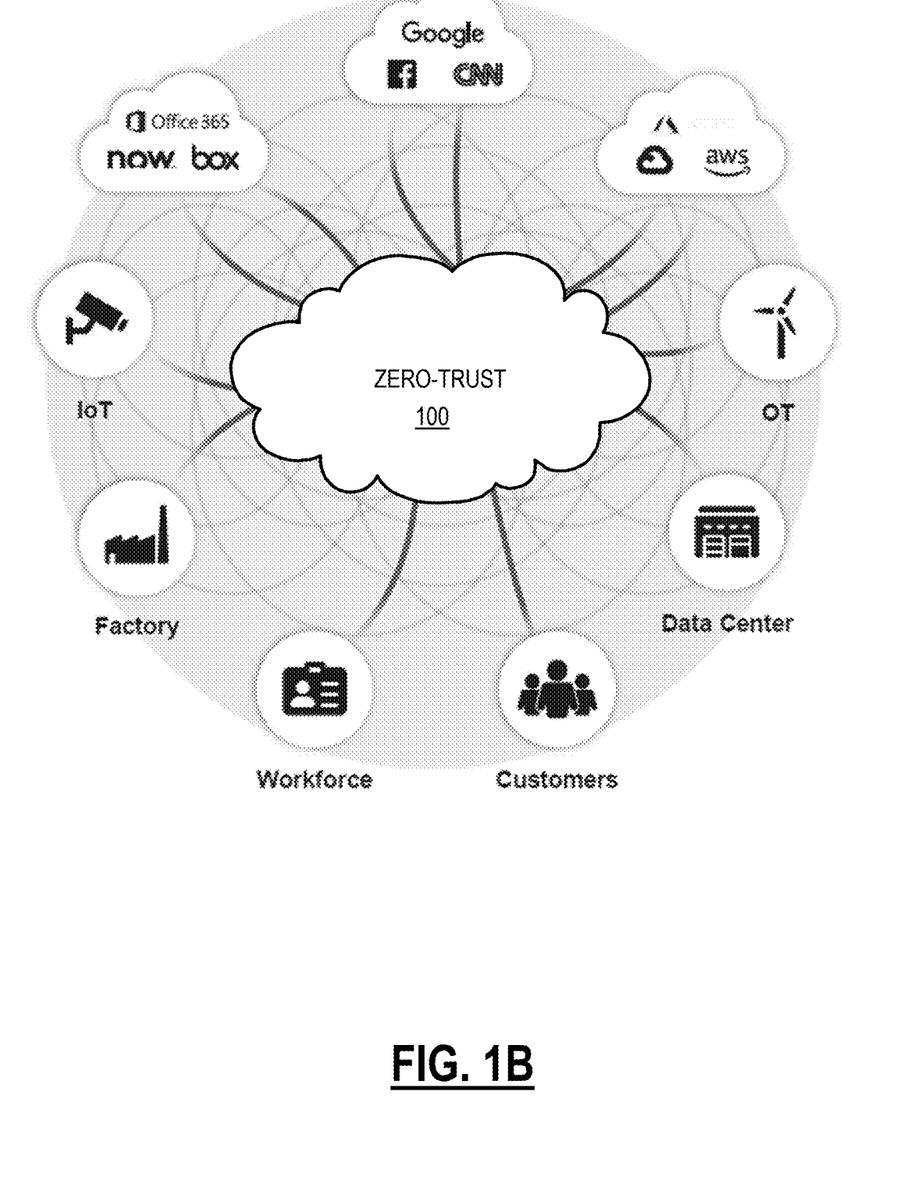
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
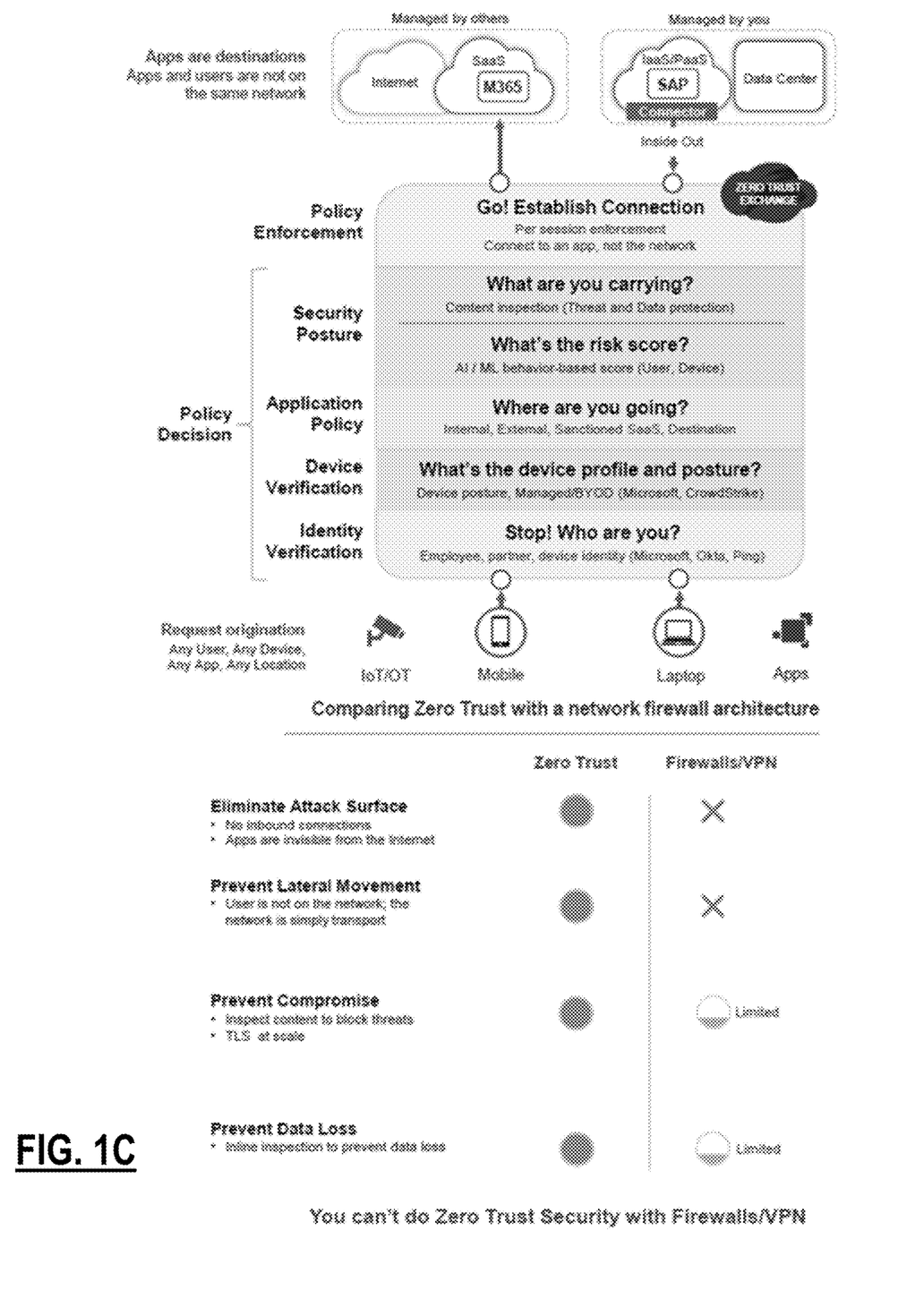
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
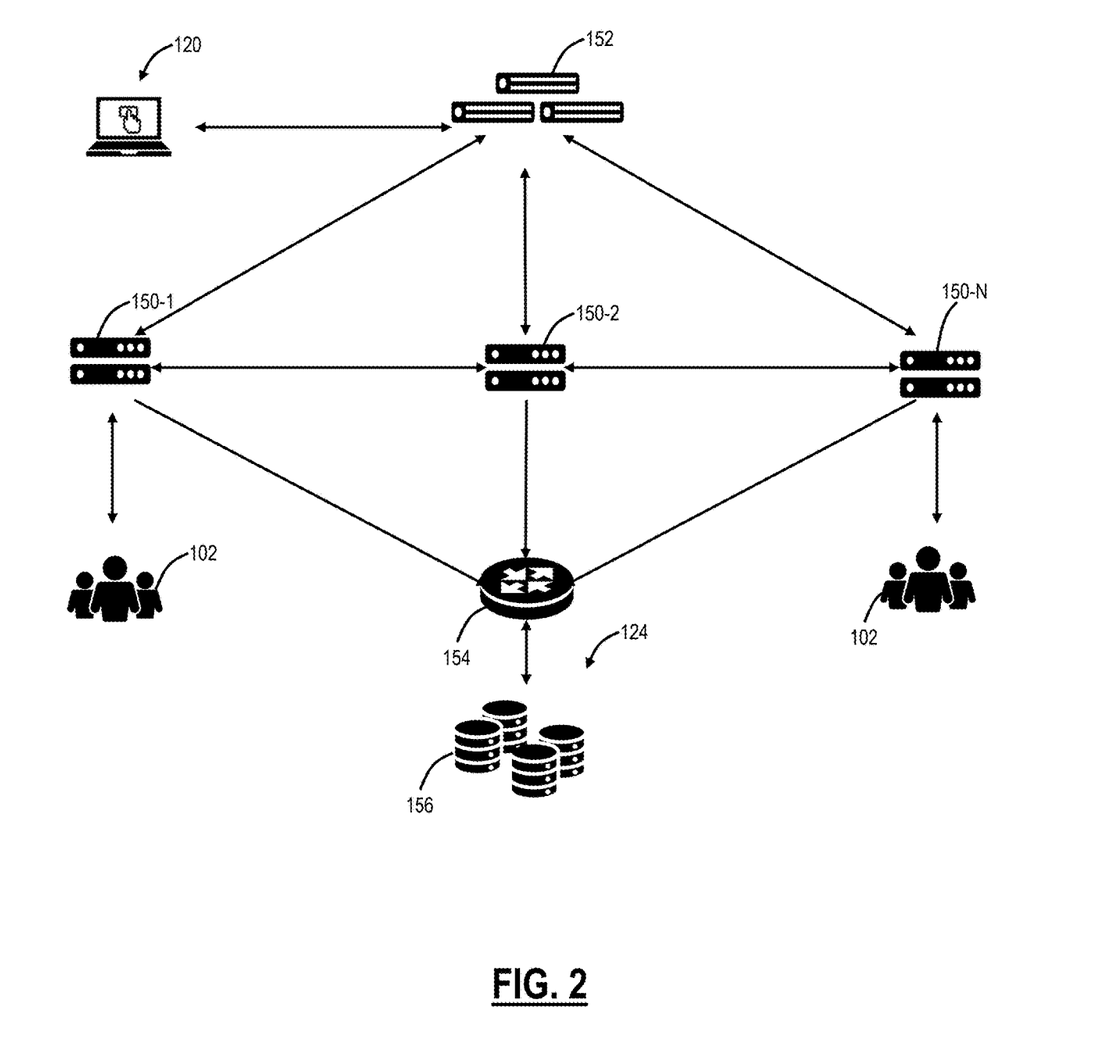
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
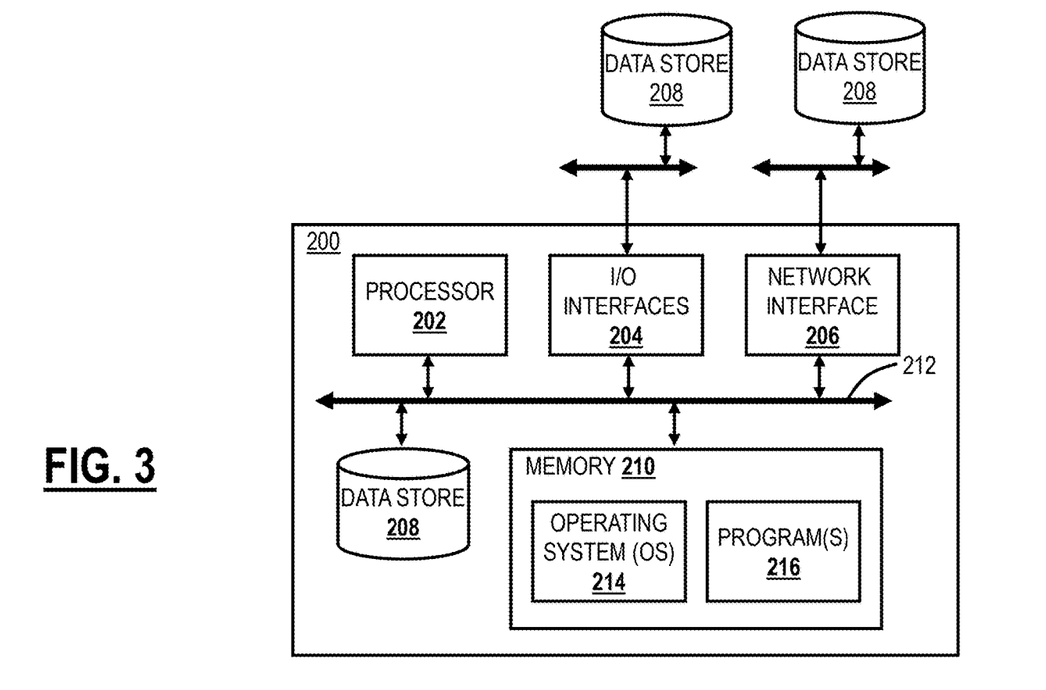
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
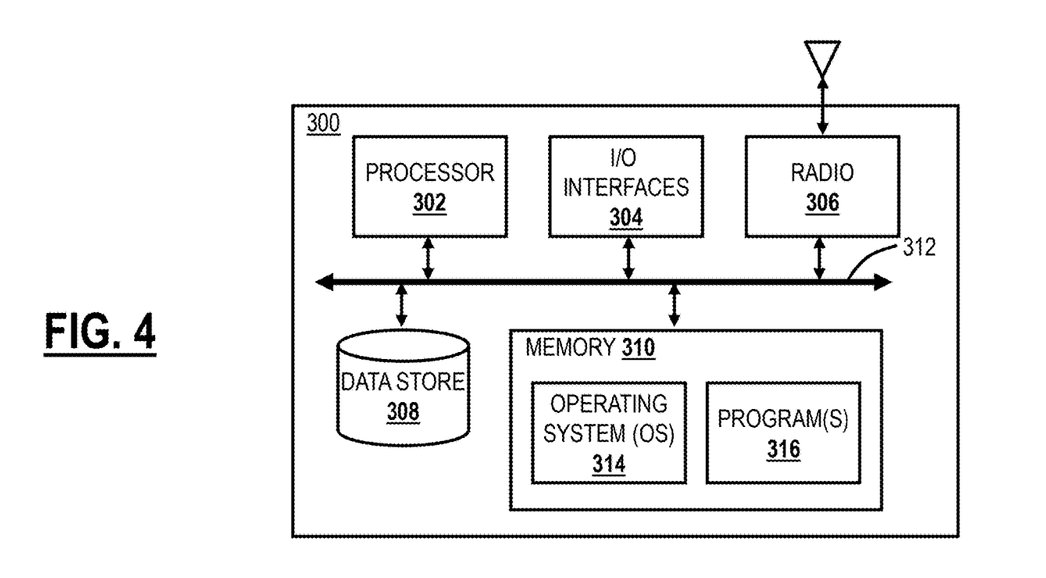

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Volumetric Attacks

Present systems and methods provide a defense against volumetric attacks to cloud services. More specifically, the present systems and methods focus on volumetric attacks which are of greater threat. Volumetric attacks by authenticated users and authenticated devices can be stopped by locking out the user or device. Similarly, volumetric attacks that come from a customer, via an app connector, private service edge, or cloud connector (note, these are Zscaler terms, and include the functionality of the application 350), can be stopped by unregistering the connector/edge. Thus, the present disclosure focuses on volumetric attacks which are more complex, such as attacks which are anonymous and attacks which are inbound from the internet.

Such attacks can overwhelm the capacity of a system, leading to overconsumption of bandwidth due to high volumes of malicious traffic. Attacks can come in many different forms including idle TCP connection attacks and failed authentication request attacks. An idle TCP connection attack can be implemented if a service accepts TCP connections from the internet, where an attacker can make many connections and leave those connections idle. The idle connections can exhaust the available file descriptors or other resource, rendering the service unavailable. Comparably, failed authentication requests can be used to cause a similar outcome. If a TLS service accepts and authenticates requests from the internet, an anonymous attacker can inflict a very high CPU cost on the service. For example, an anonymous attacker can connect to a mutual-TLS endpoint, begin the TLS handshake, and present a client certificate with an invalid signature. The server will then have to do full signature validation to learn that the signature is invalid. Similarly, an anonymous attacker can connect to a non-mutual TLS endpoint, complete a TLS handshake, then drop the TCP connection, or present invalid cookies or an invalid API key to cause an analogous response.

TLS handshakes involve public-key cryptography, which is costly in CPU time. The cost can be less than 1% of the CPU use, but if an attacker can multiply the performance hit by a thousand (1000), the CPU can be rendered completely unavailable.

Defending from Volumetric Attacks

If a high rate of authentication attempts is detected, it is beneficial to favor requests which appear to be benign. This can be achieved by performing a relatively cheap and quick Identification of Friend or Foe (IFF) assessment of each request that could be part of a volumetric attack. With an IFF, services can be provided to "friends" even while "foes" attempt a volumetric or Distributed Denial-of-Service (DDoS) attack. In the present disclosure "friend" refers to a user, group of users, etc. that do not have malicious intent, while "foe" refers to the entity performing an attack.

If a source IP address authenticates successfully, it is considered friendly. In order to authenticate, the present systems and methods perform one or more of mutual TLS, presenting valid cookies, presenting a valid API key, or whatever authentication the service endpoint requires. A plurality of scenarios can include a user logging in with a client connector. The client connector makes tunnels to public service edges (data brokers) responsive to the user logging in. During a volumetric attack, the requests to form these tunnels are given preference if the source IP is friendly, allowing the logged-in user to utilize services while being undisturbed.

Other scenarios can include a user logging in with a browser. The browser makes Hypertext Transfer Protocol Secure (HTTPS) requests to various reverse proxy applications. Note, the reverse proxy can protect the applications and the applications themselves can protect themselves, based on the present disclosure. Some HTTPS requests reuse an existing TCP connection while some create a new TCP connection, with a new TLS handshake. During a volumetric attack, the requests that involve a new TCP connection are given preference if the source IP is friendly, allowing the logged-in user to use the services while being undisturbed.

Further scenarios include a user logging in with a client connector or a browser. A few hours later, they log-in again where each login happens over HTTPS. During a volumetric attack, the second HTTPS request is given preference if the source IP is friendly. The second login request succeeds.

Cloud components connect to other cloud components. For example, exporters connect to public service edges. These connections are always considered friendly.

In various scenarios, for example, a user who roams to a new IP address is not protected at all, proving that allowing "friends" is an incomplete solution.

Various methods are contemplated to identify foes. If a TCP connection is blocked because destination is too loaded (i.e., TCP connections being over a threshold), the source IP is placed in a penalty box for ten minutes, four hours, or any other predetermined amount of time. All further connection attempts will be blocked until the amount of time up. In embodiments, this can be enabled only during a detected volumetric attack.

It can be assumed that a volumetric attack comes from only so many IP addresses, where a fraction of the number of active IP addressed are on the internet. Various embodiments have capacity to store the penalty box. Sources suggest that some larger botnets have about 100,000 IP addresses while other sources suggest millions of IP addresses.

In various embodiments, systems and methods can assume that an attacker controls a number of IP addresses (e.g., 3 million IP addresses). Instead, or in addition, embodiments can block source IP addresses by consulting an IP reputation service. Some down sides of IP reputation services include service costs, firewall embedment, and low update frequency. Further, the present approach would be more real-time than reputation services, as it will notice an attack and immediately counter it.

A public address can be both friendly and malicious. This is referred to as mixed behavior, which can happen at different scales. Some examples of mixed behavior scale are shown below.

| Scale | Friend | Foe |
| --- | --- | --- |
| A single computer | A friendly user | Volumetric malware |
| A household with a port-NAT router; by the time packets get to the internet, they all have the same source IP | A friendly user | An IoT device infected with volumetric malware |
| An office or cafe with port-NAT to the internet | A friendly user | One or more hostile devices |
| An Internet Service Provider (ISP) with port- NAT to the internet | A friendly user | Any number of hostile devices |

If the systems block a public source address, a valid user may be denied access, which aids the attack. Alternatively, if the systems allow the public source address, it might not mitigate the attack enough, presenting a complexity.

Dynamic NAT can assign a device a public IP address from a pool, where a device can be assigned a different public IP address at different times, causing further complexities. The public IP address can be identified as friendly (a friend) or malicious (a foe), but reassignment of the public IP address will make the identification stale. Although, it is understood that dynamic public IP addresses tend to be reassigned after large periods of time (i.e., every 24 hours), which gives systems time to learn. If a public IP address sends suspicious requests frequently, the systems can quickly put the address in the penalty box. Friendly requests won't be as frequent, so learning can take longer, but the scenarios listed herein still work to a useful extent. A volumetric attacker behind a PAT NAT will be able to block friendly requests coming from behind the same PAT NAT. This provides is a kind of segmentation. A bot that infiltrates a certain part of the internet can DoS other devices in the same part of the internet.

If a data center is getting twice as many authentication requests as it can handle, it must drop half. It is preferable to drop the requests least likely to succeed. The following classification rules are applied in order; the first rule that applies governs.

| Condition | Action |
| --- | --- |
| Ops policy says not to block | Do not block |
| Ops policy says to block | Block |
| Penalty box: Requests from this IP have been blocked for a ten-minute interval (or some other interval) AND the DC is over its rate limit (threshold) (considering average rate for the past minute) or over its open-connection limit. | Block |
| Friendly: From the IP there was a fully successful authentication to the cloud in the last 24 hours, AND/OR a fully successful authentication to this data center in the last ten minutes | Do not block |
| Too many authentications are in progress, with a TCP connection open but the authentication unfinished | Block. Blocking is necessary to prevent overload. But do not put the IP into the penalty box, as the blocked request might be hostile or friendly |
| DC is at or above its rate limit (considering average rate for the past minute) | Block. Blocking is necessary to prevent overload. But do not put the IP into the penalty box, as the blocked request might be hostile or friendly |
| Otherwise | Do not block |

To block is to prevent the TLS handshake and everything else. The penalty box will be unused at normal times. It will be used during a volumetric attack or an open-connection attack. Actions after authentication attempts can include the following.

| Condition | Action |
| --- | --- |
| Fully succeeded (includes checking of cookies, tokens, whatever is required) | Tell cloud this IP is OK for 24 hours |
| Did not fully succeed | Put the IP into the penalty box for ten minutes, or any other amount of time |

Various examples are contemplated herein, including assuming that friendly authentication requests come to a Data Center (DC) at 80/s. 70/s of them are from IPs that have successfully authenticated to this DC in the last 10 m, and 10/s are from IPs that have not. It is estimated that the worst-case CPU cost of handling a single request is as follows.

| Purpose | Crypto | CPU Cost (measured by running 'openssl speed' on a 2.6 GHz 6-core Intel Core i7) |
| --- | --- | --- |
| Signing with server's private key | RSA 2048 signing | 0.818 ms |
| Generating DH value | Ecdh521 | 2.2 ms |
| Multiplying our DH value by the peer's | | 0.8 ms |

-continued

| Purpose | Crypto | CPU Cost (measured by running 'openssl speed' on a 2.6 GHz 6-core Intel Core i7) |
|---|---|---|
| Validating the client cert's signature | RSA 4096 verifying | 0.174 ms |
| TOTAL | | 4 ms, approximately |

It is desired that the CPU cost of authentications take no more than 10% of the CPU capacity of a data center. The fraction (10%) should be tunable by Ops.

| What | Symbol | Example Value |
|---|---|---|
| Number of Brokers (service edges) in a Data Center | b | 2 |
| Number of cores per broker | d | 16 |
| Max CPU cost of one authentication request | c | 4 ms |

The amount of CPU available is $b \times d$. The amount willing to be used in TLS handshakes is $b \times d \times 10\%$. Let r be the aggregate handshake-request rate for this data center. The rate at which handshakes will use CPU time is at most $r \times c$.

What is desired is, $r \times c \leq b \times d \times 10\%$

Solving for $r$: $r \leq b \times d \times 10\%/c$

For example, $r \leq 2 \times 16 \times 10\%/4$ ms = 3.2/0.004 s = 800/s

To sum up, the two 16-core service edges together can handle inbound 800 TLS handshakes per second. The handshakes will consume up to 10% of the CPUs. It will be appreciated that this example is based on various assumptions. Other servers will need different rate limits. For example, a DC has fewer exporters, and each exporter has less power. The rate limit for requests to exporters would be smaller, but the calculation is the same. Ideally, the implementation will automatically discover b, c, and d for each data center, and calculate r.

Another example assumes the attacker (foe) controls 100,000 IPs.

| Lightweight Findings | Intent | More than systems can handle | Fail to authenticate | Successfully authenticate |
|---|---|---|---|---|
| Handshake requests from recently seen, friendly IPs: 70/s | Mostly friendly | 0 | 0 | 70/s → Tell cloud this IP is OK for 24 hours |
| Handshake requests from IPs in the penalty box: 0 (Attacker waits until the penalty is over) | NA | 0 | | |
| Handshake requests from IPs systems have not seen in last 10 m | Friendly: 10/s | 0 | 0 | 10/s → Tell cloud this IP is OK for 24 hours |
| | Hostile: 100K/10 m = 167/s | 0 | 167/s → Block and put into penalty box | 0 |

Assuming the attacker controls 3 million IPs.

| Lightweight Findings | Intent | More than systems can handle | Fail to authenticate | Successfully authenticate |
|---|---|---|---|---|
| Handshake requests from recently seen, friendly IPs: 70/s | Mostly friendly | 0 | 0 | 70/s → Tell cloud this IP is OK for 24 hours |
| Handshake requests from IPs in the penalty box: X/s | Mostly hostile, but not all | X/s → Block; do not prolong penalty | | |
| Handshake requests from IPs systems have not seen in last 10 m: 5010/s | Friendly: 10/s | 8.4/s → Block and put into penalty box (DC is blocking 84% of reqs from unknown IPs) | 0 | 1.6/s → Tell cloud this IP is OK for 24 hours |

-continued

| Lightweight Findings | Intent | More than systems can handle | Fail to authenticate | Successfully authenticate |
|---|---|---|---|---|
| | Hostile: 3 mil/10 m = 5000/s | 4200/s → Block and put into penalty box | 800/s → Block and put into penalty box | 0 |

In the case of a friendly client coming from an unknown IP, a friendly client may try to authenticate from an IP that the DC knows nothing about. It is desired that such a client succeeds. The probability of a block is 84%, the probability of not being blocked is 16%. If a client instance retried enough times with different data centers, it would succeed. Once it succeeded, it would receive normal treatment.

Various additional examples contemplate high volume from a mixed IP. An attacker and a friendly user can be behind the same port NAT. If it's a high volume attacker, the friendly user must be locked out. To do better with port NATs, systems can take inspiration from Single Packet Authorization (SPA). The client can put a weak proof of authenticity into the request message. This proof must be a value that an attacker cannot produce, and that a server can validate with little computing. The proof can be a Time-based One-time Password (TOTP). The key or TOTP can go into a TLS extension that is defined but not used, or into a custom extension. Each client can have a different key, where the following must occur.

Provisioning the key to the client and to all internet-facing servers in a cloud.
Periodically updating the key.
Automatically detecting compromise of a key, a volumetric attacker could misuse it.
Revoking a key at need.
Managing clock skew if systems use TOTP.

Instead of or in addition to TOTP, we can annotate each source IP address with the SNI used to connect to the cloud. This has pragmatic advantages over the TOTP approach. The biggest advantage is that it protects off-the-shelf browsers.

Implementation of Volumetric Attack Defense

In various embodiments, systems create a new micro-service, with instances in each data center. The micro-service can use a per-DC data store as its backing store.

In various embodiments, the friendly list can live in an in-memory data structure store (data store), where there will be one friendly list per cloud. It can be further updated in a master instance, and there can be read-only replicas. Cloud-wide sharing of the friendly list is additionally necessary to a plurality of the scenarios disclosed herein. Further, statistics about attempted and successful authorizations per IP will live in a Data Center (DC) data structure store, and will not be shared among DCs. During a volumetric attack, suspicious requests will be received at a great rate, making it inefficient to share the hostile lists across the cloud, neither is it necessary. If an IP address hasn't sent a suspect request in the last ten minutes or other predetermined amount of time, it is ok to forgive it.

The retention of entries in the friendly list will be related to the stability of public IP addresses. For example, if all IP addresses were assigned for 8 hours, entries in the friendly list shouldn't live longer than that. Various embodiments utilize a 24-hour retention period. The stability of friendly IP addresses can be investigated since client connector instances have identifiers, the present systems can learn how often their IP addresses change by analyzing a user status log (i.e., an auth log, the log of connections).

In various embodiments, the servers can use credentials to access the data in the data stores. Additionally, the defense system can be activated and deactivated on different servers at different times.

Figure 5:
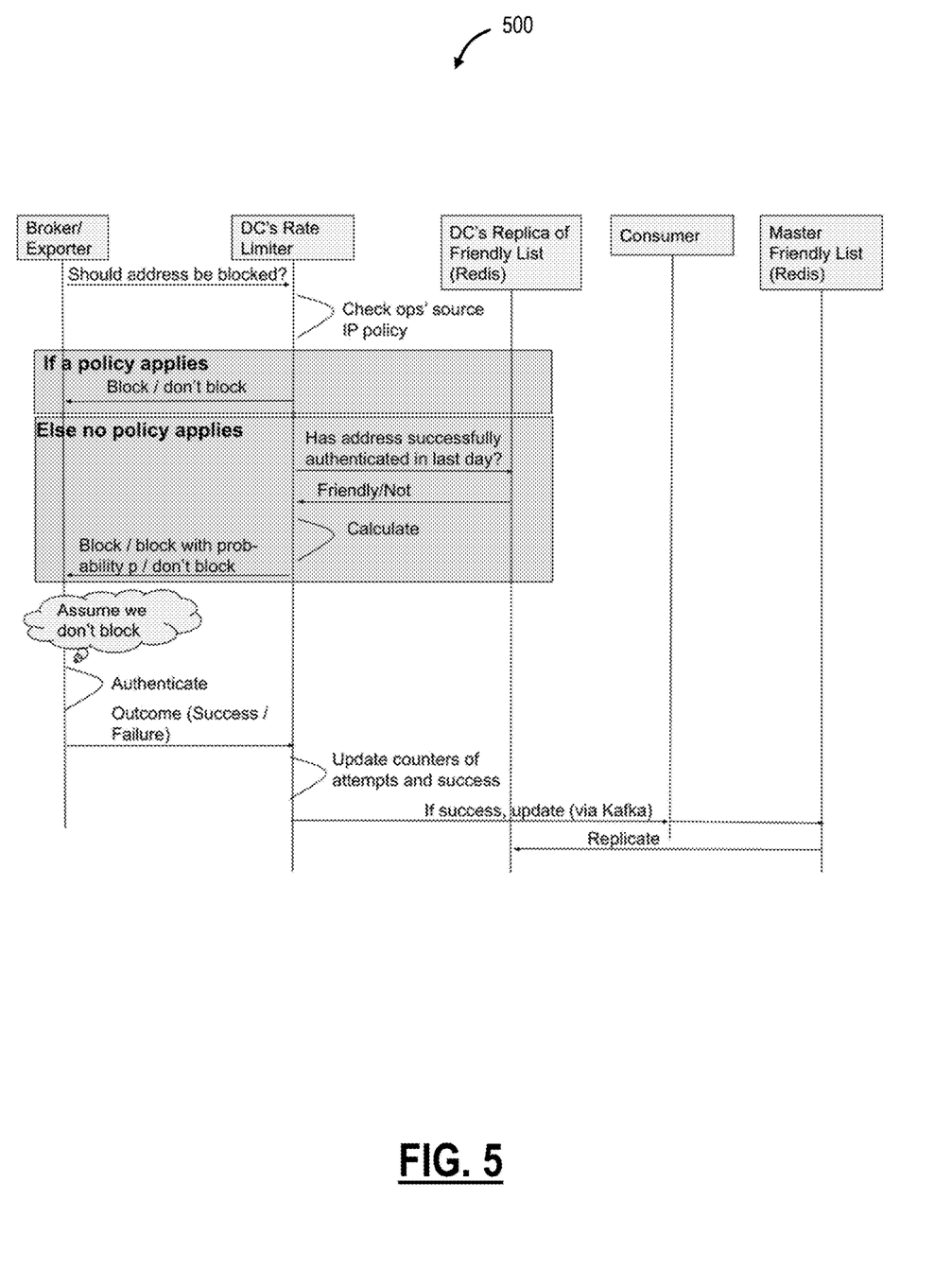
FIG. 5 is a flow diagram of the present volumetric attack defense systems and methods.

FIG. 5 is a flow diagram 500 of the present volumetric attack defense systems and methods. In various embodiments, systems and methods are adapted to detect and neutralize volumetric attacks. Various processes can utilize policy as a first defense, where requests can be blocked or not blocked based on the configured policy. When no policy applies, and a volumetric attack is suspected (i.e., if the penalty box and DC is over a rate limit), the request will be blocked. The systems will inspect if the address has been successfully authenticated within a time period, for example, within the last day. If the address has been successfully authenticated within the time period, it will not be blocked. If the address has not been successfully authenticated within the time period, and If too many TCP connections are detected, the request will be blocked. Similarly, if a rate limit is exceeded, the request will be blocked. If the address has not been successfully authenticated within the time period, and there is not too many TCP connections and rate limit is not exceeded, then the address is not blocked. Responsive to the address not being blocked, systems will attempt to authenticate the request/address. If authentication is successful, the data store is updated. If the authentication fails, the address will be placed in the penalty box for a predetermined amount of time.

Figure 6:
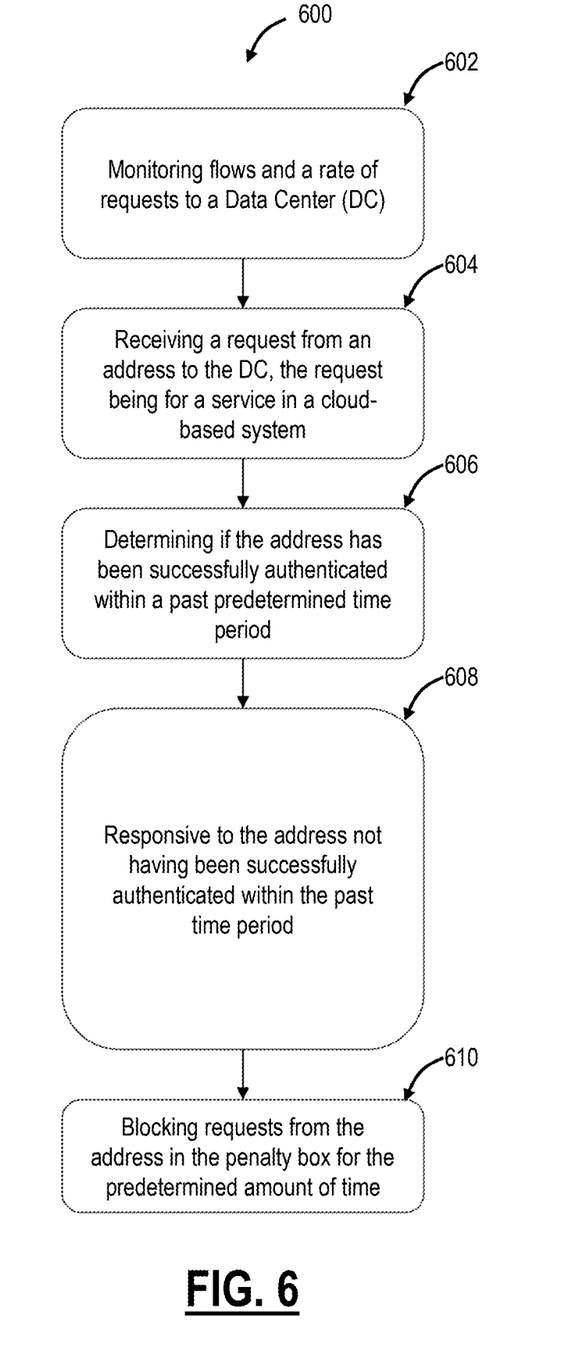
FIG. 6 is a flow diagram of a process for defending against volumetric attacks.

FIG. 6 is a flow diagram of a process 600 for defending against volumetric attacks. The process 600 can be performed through the cloud-based system 100. Also, the process 600 can be a computer-implemented method and as instructions stored in a non-transitory computer readable medium. The process 600 includes monitoring flows, such as TCP, UDP, etc. connections, and a rate of requests to a Data Center (DC) (step 602); receiving a request from an address to the DC, the request being for a service in a cloud-based system (step 604); determining if the address has been successfully authenticated within a past predetermined time period (step 606); responsive to the address not having been successfully authenticated within the past time period, and one of (i) the rate of requests being above a threshold or (ii) the number of flows being above a threshold, placing the address in a penalty box for a predetermined amount of time (step 608); and blocking requests from the address in the penalty box for the predetermined amount of time (step 610).

Process 600 can further include wherein the steps are performed only during a volumetric attack. The steps can further include responsive to the address having been successfully authenticated within the past predetermined time period, attempting to authenticate the request; responsive to successful authentication, updating a friendly list associated with the cloud-based system; and responsive to a failed authentication, placing the address in the penalty box for a predetermined amount of time. The steps can similarly include responsive to the rate of requests and the number of TCP connections being below their associated thresholds, attempting to authenticate the address; responsive to successful authentication, updating a friendly list associated with the cloud-based system; and responsive to a failed authentication, placing the address in the penalty box for a predetermined amount of time. The friendly list can be stored in the cloud-based system, and is accessible by the entire cloud-based system. A replica of the friendly list can be stored in each of a plurality of DCs in the cloud-based system. The request can further be allowed or blocked based on policy.

In various embodiments, it can be helpful to determine if a problem with the present systems has occurred or is occurring. An understanding of the behavior of the system needs to be confirmed before a problem can be fixed. A test broker (e.g., service edge) can be set up to cause frequent TLS handshake failures (simulated attack). The change in the brokers CPU consumption caused by the simulated attack can be concurrently measured. Further, the CPU cost per failed handshake can be calculated, and the rate of TLS handshake failures needed to overwhelm the CPU of the test broker can be estimated. The estimated rate can be simulated to determine if handshake failures happen at the expected rate, whether the brokers CPU use matches the prediction, and whether the broker is functional. From the simulated attack, the decision of whether there is a problem can be determined.

In various embodiments, it is necessary to create an attack (A) daemon, that will do failed authentications at a high rate, from many source IP addresses. It is then necessary to create a benign (B) daemon, that will do successful authentications at a lower rate, from fewer source IP addresses. The A and B daemons and the broker run in a private network, allowing the test to have all the addresses it needs. Ideally the broker should run on a different host from the daemons, so they don't compete for the CPU. It is expected that the broker's CPU will be maxed out, causing a significant number (10%) of B requests to fail. Next steps can include:
  Implementing the IFF and sorting, as a reusable module, since brokers will not be the only users. The module's APIs will be:
    An IFF query.
    A declaration that a source address failed authentication and is suspicious.
    A declaration that a source address passed authentication and should be put in the allowed list.
    A decision on what fraction of requests to drop, if any.
    a Calls to the data store.
  Implementing a unit test that will run with each build (the unit test will need a substitute for the data store)
  Integrating the module into the broker (an IFF query upon receiving a request and an OK declaration upon successful authentication)

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause one or more processors to perform steps of:
  monitoring flows and a rate of requests to a Data Center (DC);
  receiving a request from an address to the DC, the request being for a service in a cloud-based system;
  determining if the address has been successfully authenticated within a past predetermined time period;
  responsive to the address not having been successfully authenticated within the past time period, and one of (i) the rate of requests being above a first threshold or (ii) the number of flows being above a second threshold, placing the address in a penalty box for a predetermined amount of time; and blocking requests from the address in the penalty box for the predetermined amount of time,
wherein the steps are performed only during a volumetric attack.

2. The non-transitory computer-readable medium of claim 1, wherein the steps further comprise:
responsive to the address having been successfully authenticated within the past predetermined time period, attempting to authenticate the request;
responsive to successful authentication, updating a friendly list associated with the cloud-based system; and
responsive to a failed authentication, placing the address in the penalty box for a predetermined amount of time.

3. The non-transitory computer-readable medium of claim 1, wherein the steps further comprise:
responsive to the rate of requests and the number of TCP connections being below their associated thresholds, attempting to authenticate the address;
responsive to successful authentication, updating a friendly list associated with the cloud-based system; and
responsive to a failed authentication, placing the address in the penalty box for a predetermined amount of time.

4. The non-transitory computer-readable medium of claim 3, wherein the friendly list is stored in the cloud-based system, and is accessible by the entire cloud-based system.

5. The non-transitory computer-readable medium of claim 3, wherein a replica of the friendly list is stored in each of a plurality of DCs in the cloud-based system.

6. The non-transitory computer-readable medium of claim 1, wherein the request is allowed or blocked based on policy.

7. The non-transitory computer-readable medium of claim 1, wherein the flows are one or more of Transmission Control Protocol (TCP) connections and User Datagram Protocol (UDP) connections.

8. A method comprising steps of:
monitoring flows and a rate of requests to a Data Center (DC);
receiving a request from an address to the DC, the request being for a service in a cloud-based system;
determining if the address has been successfully authenticated within a past predetermined time period;
responsive to the address not having been successfully authenticated within the past time period, and one of (i) the rate of requests being above a first threshold or (ii) the number of flows being above a second threshold, placing the address in a penalty box for a predetermined amount of time; and
blocking requests from the address in the penalty box for the predetermined amount of time
wherein the steps are performed only during a volumetric attack.

9. The method of claim 8, wherein the steps further comprise:
responsive to the address having been successfully authenticated within the past predetermined time period, attempting to authenticate the request;
responsive to successful authentication, updating a friendly list associated with the cloud-based system; and
responsive to a failed authentication, placing the address in the penalty box for a predetermined amount of time.

10. The method of claim 8, wherein the steps further comprise:
responsive to the rate of requests and the number of TCP connections being below their associated thresholds, attempting to authenticate the address;
responsive to successful authentication, updating a friendly list associated with the cloud-based system; and
responsive to a failed authentication, placing the address in the penalty box for a predetermined amount of time.

11. The method of claim 10, wherein the friendly list is stored in the cloud-based system, and is accessible by the entire cloud-based system.

12. The method of claim 10, wherein a replica of the friendly list is stored in each of a plurality of DCs in the cloud-based system.

13. The method of claim 9, wherein the request is allowed or blocked based on policy.

14. A cloud-based system comprising:
one or more processors and memory storing instructions that, when executed, cause the one or more processors to:
monitor flows and a rate of requests to a Data Center (DC);
receive a request from an address to the DC, the request being for a service in the cloud-based system;
determine if the address has been successfully authenticated within a past predetermined time period;
responsive to the address not having been successfully authenticated within the past time period, and one of (i) the rate of requests being above a first threshold or (ii) the number of flows being above a second threshold, place the address in a penalty box for a predetermined amount of time; and
block requests from the address in the penalty box for the predetermined amount of time,
wherein the steps are performed only during a volumetric attack.

15. The cloud-based system of claim 14, wherein the steps further comprise:
responsive to the address having been successfully authenticated within the past predetermined time period, attempting to authenticate the request;
responsive to successful authentication, updating a friendly list associated with the cloud-based system; and
responsive to a failed authentication, placing the address in the penalty box for a predetermined amount of time.

16. The cloud-based system of claim 14, wherein the steps further comprise:
responsive to the rate of requests and the number of TCP connections being below their associated thresholds, attempting to authenticate the address;
responsive to successful authentication, updating a friendly list associated with the cloud-based system; and
responsive to a failed authentication, placing the address in the penalty box for a predetermined amount of time.

17. The cloud-based system of claim 14, wherein the request is allowed or blocked based on policy.

* * * * *